Patented Feb. 4, 1941

2,230,875

UNITED STATES PATENT OFFICE 2,230,875

ACID SALTS OF P-AMINOBENZENE SULPHONYL GUANIDINE

Philip Stanley Winnek, Riverside, Conn., assignor to American Cyanamid Company, New York, N. Y., a corporation of Maine No Drawing. Application September 19, 1940, Serial No. 357,501

6 Claims. (Cl. 260—501)

The present invention relates to the salts of p-aminobenzene sulphonyl guanidine. The p-aminobenzene sulfonyl guanidine compound as the free base is not claimed in this application since that compound is claimed in my copending application Serial No. 320,430 filed February 23, 1940, which matured into U. S. Patent 2,218,490 on October 15, 1940, of which the present application is a continuation in part.

The compounds of this invention are useful as chemotherapeutic agents and also as intermediates in the preparation of other compounds.

The p-aminobenzene sulphonyl guanidine base used in making the salts of this invention may be prepared by reducing the p-nitrobenzene sulphonyl guanidine as described in the above-mentioned copending application or by hydrolysis of p-acetyl aminobenzene sulphonyl guanidine as described in my copending application Serial No. 357,500, filed September 19, 1940.

The present invention is not limited to any particular method for preparing the salts of p-aminobenzene sulphonyl guanidine and any suitable method may be employed since the p-aminobenzene sulphonyl guanidine is sufficiently basic in reaction to combine with any inorganic or organic acid and form salts therewith. The ordinary inorganic salts, such as the hydrochlorides, sulphates, phosphates, chlorates and the like may be prepared by adding p-aminobenzene sulphonyl guanidine to a relatively strong aqueous solution of the acid. A salt produced by the reaction may be very conveniently recovered by diluting the aqueous solution with an organic solvent such as acetone and recovering the resulting precipitate by filtration. The salts of the water soluble organic acids, such as for example acetic, lactic, citric, and the like, may be prepared as described in the process above. Another suitable method for preparing the salts comprises a method in which a relatively water insoluble organic acid, such as benzoic, is dissolved in an organic solvent, for example ethyl alcohol, and the p-aminobenzene sulphonyl guanidine added to this solution, in which case the salt may be recovered by any convenient means as for example by evaporating the solution to dryness. Still another method for preparing salts in accordance with the present invention comprises a process in which p-amino-benzene sulphonyl guanidine hydrochloride, preferably in the form of an aqueous solution, is reacted with substantially one molecular proportion of the sodium salt of an organic acid, for example, sodium phthalate, also preferably in aqueous solution and the acid salt separated from the sodium chloride.

It is readily seen, therefore, that the present invention relates to and includes any inorganic acid salt. Similarly this invention includes any organic acid salt of p-aminobenzene sulphonyl guanidine including the saturated and unsaturated hydroxy, halogenated or other substituted acids of the aliphatic, alicyclic, aromatic, and heterocyclic series. Preferably the salts are those produced from relatively non-toxic organic acids or those having some bactericidal or other therapeutic property, including acids such as acetic, salicylic, mandelic, lactic, and the like.

The invention will be described in greater detail in conjunction with the following specific examples which are merely illustrative of suitable methods for preparing representative compounds of the class and are not intended to limit the scope of the invention. Parts are by weight except in the case of liquids which are expressed in corresponding parts by volume.

Example 1

13 parts of p-aminobenzene sulphonyl guanidine were added to 30 parts of 6 N lactic acid solution. The suspension was boiled for 10 minutes, cooled and filtered. A further amount of product was obtained by adding to the filtrate 30 parts of acetone and an excess of ether. The salt obtained was a white crystalline product soluble in boiling water.

Example 2

One part of p-aminobenzene sulphonyl guanidine was added to 2 parts of 95% phosphoric acid and heated just to boiling, cooled and filtered. The salt obtained was a white crystalline product soluble in water.

Example 3

6 parts of p-aminobenzene sulphonyl guanidine dissolved in 60 parts of hot water were added to 3 parts of salicylic acid dissolved in 100 parts of hot water, cooled and filtered. The salt obtained was a white crystalline product soluble in boiling water.

Example 4

One part of p-aminobenzene sulphonyl guanidine was dissolved in 2 parts of hot concentrated sulphuric acid, cooled, and acetone added to precipitate. The suspension was filtered. The sulphate obtained was a white crystalline solid, insoluble in acetone but soluble in cold water.

Example 5

To 33 parts of sulphanilamido guanidine was added 10 parts of concentrated hydrochloric acid and sufficient water to form a hot solution. 18 parts of mandelic acid was added to 48 parts of 10% sodium hydroxide and sufficient water was added to make a hot solution. The two solutions were mixed and a white crystalline product soluble in hot water was obtained. After cooling the salt was recovered by filtration.

What I claim is:

1. Acid salts of p-aminobenzene sulphonyl guanidine.
2. Inorganic acid salts of p-aminobenzene sulphonyl guanidine.
3. Organic acid salts of p-aminobenzene sulphonyl guanidine.
4. p-Aminobenzene sulphonyl guanidine phosphate.
5. p-Aminobenzene sulphonyl guanidine lactate.
6. p-Aminobenzene sulphonyl guanidine salicylate.

PHILIP STANLEY WINNEK.